Feb. 20, 1962     L. E. WATERS     3,022,412
DEICER
Filed Sept. 26, 1958

INVENTOR.
LAWRENCE E. WATERS

BY

*P. L. Miller*
ATTORNEY

United States Patent Office 3,022,412
Patented Feb. 20, 1962

3,022,412
DEICER
Lawrence E. Waters, Tallmadge, Ohio, assignor to The Goodyear Tire & Rubber Company, Akron, Ohio, a corporation of Ohio
Filed Sept. 26, 1958, Ser. No. 763,672
5 Claims. (Cl. 219—46)

This invention relates to electrical resistance heating units and in particular to electrical resistance wire deicers for use on aerodynamic surfaces of aircraft.

The removal of ice from the aerodynamic surfaces of aircraft has long presented difficult problems. Some of the problems arise from the necessity for providing extremely uniform distribution of heat in the areas likely to collect ice and to avoid cold spots on airfoil deicers. The advent of supersonic aircraft has imposed more stringent requirements that deicers interfere as little as possible with the aerodynamic character of the airfoil and be capable of being formed around sharp edges with minimum deformation and variation in electrical characteristics.

It is a principal object of the present invention to provide a deicer structure which may be formed about sharp edges and short radii with a minimum of distortion and aerodynamic interference. A further object of the present invention is to provide a deicer producing maximum uniformity of heat in the desired areas. An additional object of the present invention is to provide a deicer structure which may be more easily manufactured and installed. A still further object of the present invention is to provide a deicer with a heating element which can withstand substantial physical stresses with minimum deformation. These and other objects of the present invention will become clear from the following description and drawings in which:

Figure 1:
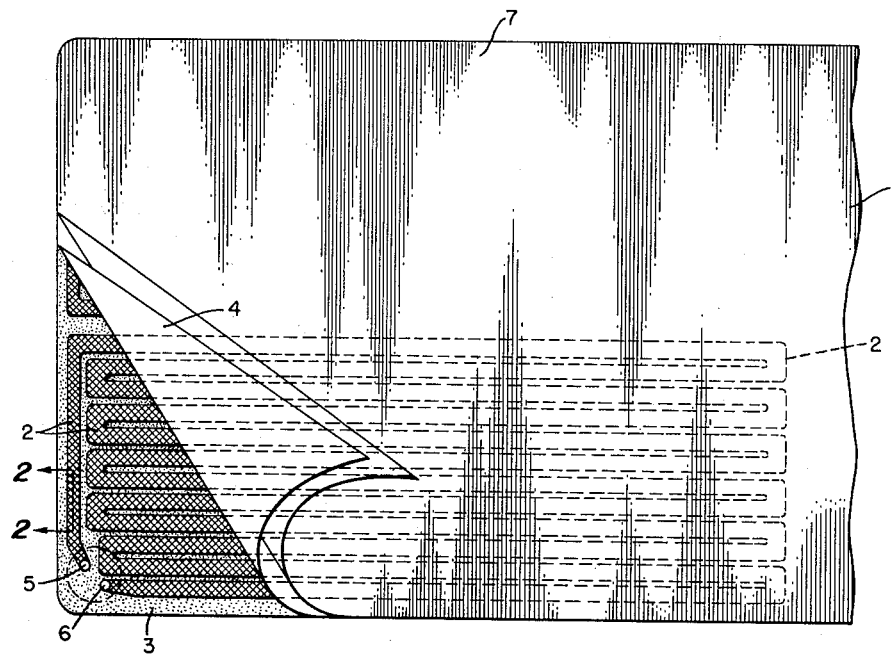
FIG. 1 is a partial cutaway of a deicer of the present invention.

Operational requirements for deicers have become much more stringent with the advent of trans-sonic and supersonic aircraft. Prior art structures utilizing conductive rubber heating elements are inadequate to meet the demands of the modern aircraft because it is difficult to make the deicers sufficiently thin to avoid aerodynamic distortion and also since, when bent around the sharp edges of airfoils, tension in the conductive rubber layer caused changes in resistance and, hence, in the heat output. Deicers utilizing metallic conductors in fabric or as single or twisted strand heaters have not been fully satisfactory since, when bent over sharp edges, the wires tend to buckle and push towards the deicer surface causing aerodynamic interference and loss of electrical efficiency. In addition, such wire elements cannot be turned about short radii so that the individual passes of the heating conductor are close enough to each other to provide uniform heating in the deicer. It has, therefore, been necessary to construct deicers utilizing wire elements by arranging a plurality of conductors between large bus bars in electrically parallel fashion in order to permit the close spacing of the conductors. However, the presence of the large bus bars not only increases the deicer bulk but results in cold spots due to the wider distribution of heat in the bus area. This condition, while permissible under some circumstances, cannot be tolerated on high speed aircraft.

The present invention satisfactorily avoids the problems mentioned through the use of a conductor comprising a plurality of metallic conductors in a broad, flat braided form. It has been found to be preferable to use relatively small diameter uninsulated conductors arranged in a thin braid. Furthermore, it is preferable that the particular wire of the heating element be of such a composition and temper as to be relatively plastic, i.e. easily and permanently deformable, to facilitate placement of the heating element in a sinuous or serpentine arrangement. While less ductile or deformable wire may be used, it is more difficult to achieve and maintain a serpentine configuration.

The use of a braided heating element provides extremely uniform heating and a deicer of minimum thickness, the heating elements of which will not buckle under stresses caused by bending the deicer around a sharp edge. Due to the nature of the braid and the plasticity of the individual metallic elements, a single, series heating element may be used arranged in serpentine fashion back beside itself, thus eliminating the large bus bars of prior art devices. This also assures less possibility of stress fracture of the conductor or localized change in resistance. For most deicer constructions it is preferable to use as open a braid as permitted by electrical and heat density limitations in order to facilitate turning the heating element. In addition, an open braid is desirable to permit the dielectric to penetrate the interstices of the braid to firmly lock the braided element in place in the deicer structure. This not only minimizes the possibility of separation of the deicer layers under stress but provides a smoother aerodynamic surface.

Because of the close contact of uninsulated neighboring conductive elements, the braided element acts electrically substantially as a strip heater. However, unlike a flat strip, the braid can be made to turn in the plane of its transverse axis with relative ease due to the pantographing of the conductors with respect to themselves. Nonetheless, even though twisted or bent repeatedly, the total resistance of the heater remains the same and, hence, the heat remains uniform.

In deicers utilizing single strand or multiple strand twisted conductors, it is a problem to avoid pulling the conductors out of the deicer or possibly fracturing them due to physical stresses between the deicer and the power leads encountered in installation and service. It has been the practice in such cases to provide a non-conductive structural element physically connecting the power lead and the deicer body to absorb the stresses ordinarily transmitted to the conductors. With the braided structure of the present invention, it is unnecessary to provide such a member since it has been found that the braided conductor is sufficiently strong and firmly locked in place in the surrounding dielectric to absorb these stresses. The elimination of the structural element renders manufacture and installation much simpler, as does the elimination of bus bars. Moreover, the braided heating element gives less risk of a structural weak spot or an electrical anomaly due to the intimate interlacing of the individual conductive elements.

Referring to FIG. 1, the deicer 1 comprises a serpentine heating element 2 sandwiched between inner and outer dielectric layers 3 and 4. The dielectric may be a variety of materials such as rubber, if it is desired that the deicer have substantial flexibility, or a resin, or other material such as fiber glass, if a rigid type of deicer is preferred. In the latter case, the deicer is preferably molded to the contour of the air foil to which it is to be attached. A single series element 2 is passed in serpentine fashion across the entire area to be heated so that only two connections such as at 5 and 6 are necessary to complete the heating circuit. Of course, a plurality of heaters either in parallel or connected to groups to separate power sources may be used where portions of the deicer are to be supplied with different power levels or are to be cyclically heated. It is preferable, however, to keep the electrical connections to a minimum. The deicer may be provided with a metallic breeze surface 7 in order to provide maximum erosion resistance. The layer 7 which overlies either all or a part of the outer dielectric layer 4 may be made of stainless steel, nickel, aluminum, or similar materials, stainless steel being preferable. The metallic surface may be eliminated if the type of service to be encountered or the location of the deicer permits. Also a plastic or resinous material may be used in lieu of the metal.

Figure 2:
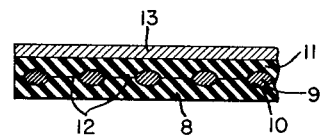
FIG. 2 is a cross section of the deicer of FIG. 1 along the line 2—2.

The arrangement of the various components of a typical deicer may be seen in section in FIG. 2. The deicer in FIG. 2 comprises a layer 8 of rubber on which is placed the braided heater in a flat layer 9 containing conductors 10. A second layer 11 of rubber covers the heater to form the sandwich structure indicated. Due to the open nature of the braid, the rubber of layers 10 and 11 penetrate the heater structure to form dielectric bridges 12 which resiliently lock the braid in place. The integral structure thus formed is able to withstand substantial stresses and yet permit slight movement of the conductors as they expand and contract or pantograph with respect to one another. The stainless steel breeze surface 13 may be applied in a number of ways such as spraying or cementing, the preferable method being to place the thin metal sheet on the unvulcanized structure and vulcanizing the entire assembly in one operation.

Figure 3:
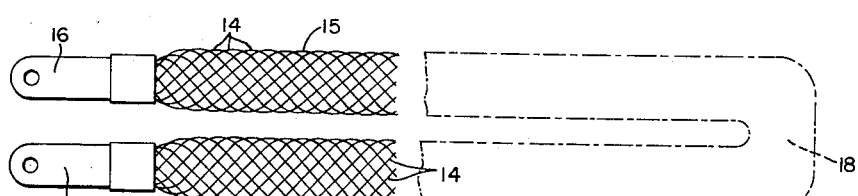
FIG. 3 is a detail of a deicer heating element.

A typical braided heating element shown in FIG. 3 comprises a plurality of uninsulated metal strands 14 braided into the flat unitary structure 15. The electrical connectors 16 and 17 may be attached to the ends of the heater by a number of means such as soldering or crimping. It has been found that due to the inherent strength of the braided structure, in contrast to the prior art devices, no special devices need be provided in order to assure a strong physical connection between the body of the deicer and the power leads to resist stresses encountered in service. The braided structure 15, although illustrated as consisting of single wire strands, may be made utilizing a plurality of parallel strands in order to secure higher or lower resistance, strength, or heat dissipating area.

If desired, the braid may be expanded transversely in the area of the curve at 18 in order to provide for heat dissipation which is uniform along the entire length of the conductor. Due to its open braided nature, the heater is easily turned in the plane of its transverse axis so that it may be run in closely spaced courses back and forth through the entire deicer in order to minimize the occurrence of cold spots between conductor lengths. The resistance per unit length of the heating element may be varied by altering the number of strands utilized in the braid or different alloys may be used in individual strands to secure optimum characteristics such as thermal coefficient of resistance, thermal expansion, plasticity, and electrical resistance.

The heat dissipating area of the conductor may be reduced by the expedient of tensioning the braid to cause it to reduce in transverse section and increase in length. Such a reduction will not substantially affect the resistance of the conductor and, hence, will not change the current in the circuit but may be utilized to vary the watt density in any particular area. Hence, a varying heat distribution can be provided in a deicer section. It is obvious that the watt density can also be reduced by expanding the braid transversely. This, however, is somewhat more difficult to control than is the reduction of the braid width. It is therefore preferable that the braid be manufactured to the maximum required width and conductor spacing and subsequently reduced in transverse section to the desired width by means of tension. Usually the conductor is retained in the same width as manufactured. This may be assured by dipping the braided heating element in a moderate strength adhesive to prevent the inadvertent alteration of the braid size during manufacturing of the deicer. By limiting the strength of the adhesive, it is possible to reduce the braid width in any desired area by means of localized tension adequate to fracture the adhesive bond between the individual strands.

Figure 4:
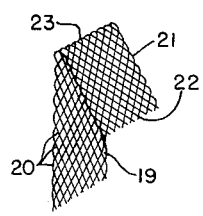
FIG. 4 is a view of a portion of a typical heating element.

As previously mentioned, the braided element is usually sufficiently strong to withstand the forces which tend to pull the power leads and deicer body apart. However, if a braided heating element of extremely fine conductors is desired for some purposes, adequate strength may be provided at the connector by the expedient illustrated in FIG. 4. As illustrated, the heater 19 comprises a number of fine conductors 20 which may under certain circumstances be relatively weak structurally. The element 19 then be bent back upon itself as at 21 to provide a heavier section for the structural bridge between the deicer and the power lead without seriously affecting the resistance in the circuit. One end 22 of the folded portion 21 may be embedded in the dielectric of the deicer and the other end 23 connected to the power lead. Since the braid 19 is readily deformable, it may be easily folded in the manner illustrated without fear of fracture such as might occur in a strip heater of similar dimensions.

Figure 5:
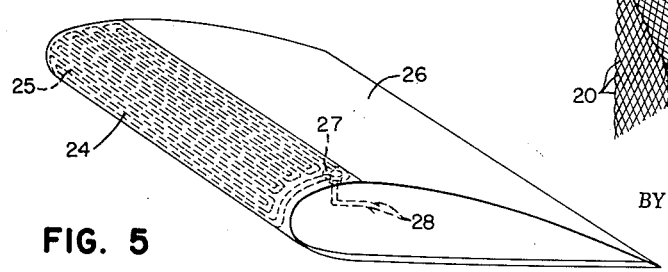
FIG. 5 is a view of a typical airfoil with a deicer installed thereon.

FIG. 5 illustrates a typical deicer installation. A deicer 24 having the braided heater 25 in serpentine courses substantially parallel to the longitudinal axis of the coil is mounted on an airfoil 26. Although it is normal practice to run the conductor the long way of the deicer, it is not necessary to do so with a braided wire element since the inherent flexibility of the braided construction permits the use of a heating element which may be run in courses in the direction of the shortest radius of the airfoil without substantial risk of buckling or fracture. The deicer 24 is provided with a molded integral connector 27 at one end which may be vulcanized to the deicer during the manufacturing process. The connector 27 contains electrical leads similar to 16 and 17 in FIG. 3 which contact the power line 28 from the aircraft electrical system.

While certain representative embodiments and details have been shown for the purpose of illustrating the invention, it will be apparent to those skilled in this art that various changes and modifications may be made therein without departing from the spirit or scope of the invention.

I claim:

1. A deicer for use on aerodynamic surfaces of aircraft comprising an inner dielectric layer, an outer dielectric layer, and an extensible-compressible flat braided electrical heating element formed throughout substantially its entire conductive portion essentially of a braid of uninsulated metallic conductors between said dielectric layers and forming an integral structure therewith.

2. A deicer for use on aerodynamic surfaces of aircraft comprising an inner rubber layer, an outer rubber layer, and an extensible-compressible flat braided electrical heating element formed throughout substantially its entire conductive portion essentially of a braid of uninsulated metallic conductors between said rubber layers and forming an integral structure therewith.

3. A deicer for use on aerodynamic surfaces of aircraft comprising an inner rubber layer, an outer rubber layer, and an extensible-compressible flat open braided electrical resistance heating element formed throughout substantially its entire conductive portion essentially of a braid of metallic conductors between said rubber layers, the rubber of said layers filling the interstices of said braided heating element to form a link between said layers and resiliently lock said element into an integral structure with said rubber layers.

4. A deicer for use on aerodynamic surfaces of aircraft comprising an inner rubber layer, an outer rubber layer, and an extensible-compressible flat open braided electrical resistance heating element formed throughout substantially its entire conductive portion essentially of a braid of uninsulated metallic conductors between said layers and arranged in serpentine fashion to heat the desired surface, the rubber of said layers filling the interstices of said braided heating element to form a link between said layers and resiliently lock said element into an integral structure with said rubber layers.

5. A deicer for use on aerodynamic surfaces of aircraft comprising an inner dielectric layer, an outer dielectric layer, and an extensible-compressible flat open braided electrical resistance heating element formed throughout substantially its entire conductive portion essentially of a braid of metallic conductors between said dielectric layers, the dielectric of said layers filling the interstices of said braided heating element to form a link between said layers and lock said element into an integral structure with said dielectric layers.

References Cited in the file of this patent

UNITED STATES PATENTS

| | | |
|---|---|---|
| 717,778 | Spaulding | Jan. 6, 1903 |
| 1,362,351 | Rankin | Dec. 14, 1920 |
| 1,944,390 | Aceves | Jan. 23, 1934 |
| 2,503,457 | Speir et al. | Apr. 11, 1950 |
| 2,522,542 | Schaefer | Sept. 19, 1950 |
| 2,743,890 | La Rue | May 1, 1956 |
| 2,758,194 | Heron | Aug. 7, 1956 |
| 2,762,897 | Vrooman et al. | Sept. 11, 1956 |
| 2,809,268 | Heron | Oct. 8, 1957 |
| 2,836,698 | Fry | May 27, 1958 |
| 2,884,509 | Heath | Apr. 28, 1959 |

FOREIGN PATENTS

| | | |
|---|---|---|
| 171,147 | Switzerland | Nov. 16, 1934 |